(No Model.)
S. S. WILLIAMSON.
NUT LOCK.
No. 263,273. Patented Aug. 22, 1882.
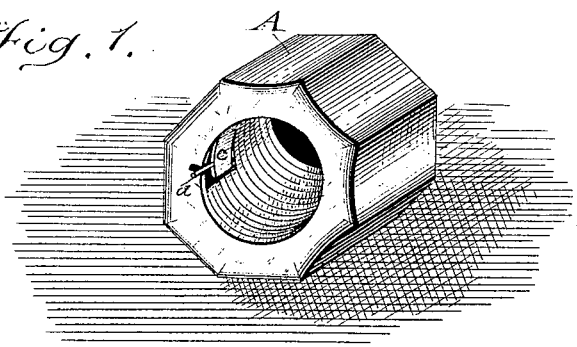
Fig. 1.
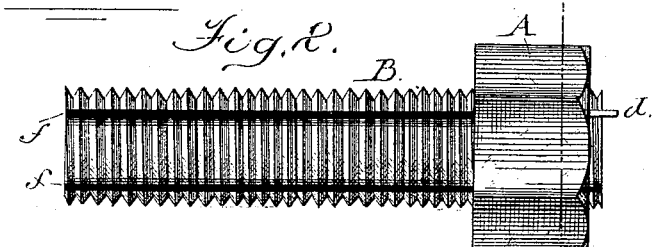
Fig. 2.
Fig. 5.
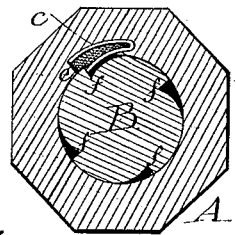
Fig. 3.
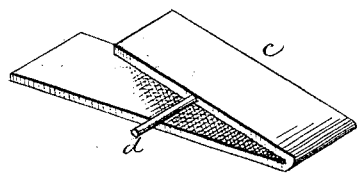
Fig. 4.
Witnesses;
Walter Fowler,
James O. Marceron
Inventor;
S. Stuart Williamson

UNITED STATES PATENT OFFICE.

S. STUART WILLIAMSON, OF WASHINGTON, D. C., ASSIGNOR OF ONE-HALF TO WILLIAM H. HANFORD, OF SAME PLACE.

NUT-LOCK.

SPECIFICATION forming part of Letters Patent No. 263,273, dated August 22, 1882.

Application filed June 15, 1882. (No model.)

*To all whom it may concern:*

Be it known that I, S. STUART WILLIAMSON, a citizen of the United States, residing at Washington, in the District of Columbia, have invented certain new and useful Improvements in Nut-Locks; and I do hereby declare the following to be a full, clear, and exact description of the invention, such as will enable others skilled in the art to which it appertains to make and use the same.

The object of this invention is to provide a simple, cheap, and positive automatic nut-lock which can be readily screwed up and unscrewed; and to this end it consists in a nut having a V-shaped cavity in which fits a V-shaped spring, one end of which acts as a pawl and engages with the grooves of a bolt, which will be hereinafter more fully set forth in the annexed specification, and pointed out in the claims.

Reference being had to the accompanying drawings, which form a part of this specification, Figure 1 is a perspective of the nut, showing the spring in its cavity. Fig. 2 is an elevation of the nut and bolt, showing the grooves. Fig. 3 is a section of the bolt and nut, taken from line X X. Fig. 4 is a perspective of the spring, and Fig. 5 is an enlarged perspective of the key used in unlocking the nut.

Corresponding letters indicate like parts.

A is the nut, inside and near the end of which is formed the V-shaped cavity $e$, in which fits V-shaped spring $c$, one end being made preferably shorter than the other. The said spring is held in cavity $e$ by its tendency to spring outward.

$d$ is the projection by which the spring may be compressed, with the key shown in Fig. 5, when it is desired to unscrew the nut.

Key $h$, Fig. 5, is made of a metal strip, having one of its ends bent at right angles, so as to hook over the edge of the nut, and in the other end a hole that is adapted to fit onto projection $d$ of spring $c$. The length of key $h$ is is a little less than the thickness of the walls of the nut, and hence when it is slipped on projection $d$ and hooked over the edge of the nut it will compress spring $c$, disengaging its free end from the grooves $f$ of bolt B, allowing the nut to be run off.

$i$ is the recess cut in the wall of cavity $e$ to permit projection $d$ of spring $c$ to move outward when it is desired to compress said spring $c$.

B is the bolt, having grooves $f$, with which engages the free end of spring $c$. The spring $c$ and its projection $d$ may be stamped out of one piece, making the cost very small. In inserting spring $c$ in cavity $e$ the wedge end is shoved in the cavity until the long end springs therein, where it will be retained until its ends are compressed and withdrawn.

From the foregoing description it will be obvious that when nut A is screwed onto bolt B the free end of spring $c$, acting as a pawl, will engage with the grooves $f$, preventing the nut from coming unscrewed until it is desired to remove the same, when by hooking the key (shown in Fig. 5) onto projection $d$, and over the end of the nut the spring $c$ will be compressed, disengaging it from the grooves $f$, allowing the nut to be run off without further trouble.

Having thus described this invention, what I claim as new, and desire to secure by Letters Patent, is—

1. In a nut-lock, the nut A, having cavity $e$ and recess $i$, in combination with spring $c$, fitting in cavity $e$, and having projection $d$, which operates in recess $i$, and with the key $h$, substantially as and for the purpose specified.

2. In a nut-lock, the nut A, having cavity $e$ and recess $i$, in combination with V-shaped spring $c$ and projection $d$, substantially as and for the purpose specified.

3. In a nut-lock, the nut A, having V-shaped cavity $e$, recess $i$, spring $c$, and projection $d$, in combination with grooves $f$ of bolt B, and key $h$, substantially as and for the purpose specified.

In testimony whereof I affix my signature in presence of two witnesses.

S. STUART WILLIAMSON.

Witnesses:
 JAMES O. MARCERON,
 W. T. JOHNSON.